(12) United States Patent
Velan

(10) Patent No.: US 11,009,296 B2
(45) Date of Patent: May 18, 2021

(54) HEAT EXCHANGE CONDUIT AND HEAT EXCHANGER

(71) Applicant: ECODRAIN INC., Montreal (CA)

(72) Inventor: David Velan, Montreal (CA)

(73) Assignee: 6353908 CANADA INC., Westmount (CA)

(*) Notice: Subject to any disclaimer, the term of this patent is extended or adjusted under 35 U.S.C. 154(b) by 108 days.

(21) Appl. No.: 15/485,589

(22) Filed: Apr. 12, 2017

(65) Prior Publication Data

US 2017/0292790 A1 Oct. 12, 2017

Related U.S. Application Data

(60) Provisional application No. 62/321,355, filed on Apr. 12, 2016.

(51) Int. Cl.
*F28D 7/00* (2006.01)
*F28F 1/02* (2006.01)
(Continued)

(52) U.S. Cl.
CPC ......... *F28D 7/0025* (2013.01); *F28D 7/0033* (2013.01); *F28D 7/022* (2013.01);
(Continued)

(58) Field of Classification Search
CPC ...... F28F 1/38; F28F 1/40; F28F 13/06; F28F 13/12; F28F 13/02; F28F 9/24; F28F 1/10;
(Continued)

(56) References Cited

U.S. PATENT DOCUMENTS 1,056,373 A * 3/1913 Segelken ................. F22B 7/20
122/44.2
1,058,896 A 4/1913 Parsons
(Continued)

FOREIGN PATENT DOCUMENTS

CN 201122021 Y * 9/2008 .............. F28F 13/12
EP 257220 3/1988
(Continued)

OTHER PUBLICATIONS

CN 201122021 Y Machine Translation—Retrieved Jan. 2019 (Year: 2001).*
(Continued)

*Primary Examiner* — Len Tran
*Assistant Examiner* — Jenna M Hopkins
(74) *Attorney, Agent, or Firm* — Norton Rose Fulbright Canada LLP

(57) ABSTRACT

A heat exchange conduit includes a conduit body extending along a longitudinal axis between an inlet at one end thereof and an outlet at an opposed end. The conduit body has at least one conduit wall. At least one of said conduit walls is a heat-exchange wall shaped to be in heat exchange relationship with an object or fluid in contact therewith. An elongated turbulence strip is disposed within the conduit body and extends along a length thereof. The turbulence strip has longitudinally spaced-apart flow impact walls. Each flow impact wall has a peripheral rim and is perpendicular to the longitudinal axis. A flow gap for fluid flow is defined between at least a portion of the peripheral rim of each flow impact wall and an adjacent inner surface of the at least one conduit wall.

11 Claims, 7 Drawing Sheets

(51) Int. Cl.
*F28D 7/02* (2006.01)
*F28F 1/40* (2006.01)
*F28D 21/00* (2006.01)
*F28F 13/12* (2006.01)

(52) U.S. Cl.
CPC .......... *F28D 21/0012* (2013.01); *F28F 1/022* (2013.01); *F28F 1/40* (2013.01); *F28F 13/12* (2013.01)

(58) Field of Classification Search
CPC ...... F28F 9/0202; F28F 9/0263; F28F 9/0265; F28F 9/027; F28F 9/028; F28F 2009/222; F28F 2009/224; F28F 2009/029; F28D 1/0473; F28D 1/0471; F28D 7/0025; F28D 7/0041; F28D 7/02; F28D 7/022; F28D 7/033; F28D 7/04; F28D 7/08; F28D 7/163; F28D 7/1684; F28D 21/0012
USPC .... 165/109.1, 159, 160, 161, 173, 174, 175, 165/179, 181, 182, 183; 138/38, 39
See application file for complete search history.

(56) References Cited

U.S. PATENT DOCUMENTS

| | | | | |
|---|---|---|---|---|
| 2,488,615 A * | 11/1949 | Arnold | F28F 1/40 | 138/38 |
| 2,650,801 A | 9/1953 | Collito | | |
| 2,677,394 A * | 5/1954 | Brinen | F01P 11/08 | 138/38 |
| 2,688,986 A * | 9/1954 | O'Brien | F01P 11/08 | 138/38 |
| 2,691,991 A * | 10/1954 | Schutt | F01M 5/00 | 138/38 |
| 2,890,722 A | 6/1959 | Loebel et al. | | |
| 3,269,420 A * | 8/1966 | Woodling | F15D 1/065 | 138/38 |
| 3,512,581 A | 5/1970 | Lawton | | |
| 3,548,072 A | 12/1970 | Maschio | | |
| 3,769,959 A * | 11/1973 | Parker | A47J 37/1247 | 126/91 R |
| 4,106,558 A * | 8/1978 | Neveux | F28F 13/12 | 165/109.1 |
| 4,256,170 A | 3/1981 | Crump | | |
| 4,412,558 A * | 11/1983 | Burke | F28F 13/12 | 122/155.2 |
| 4,577,681 A * | 3/1986 | Hughes | F23M 9/00 | 138/38 |
| 4,602,672 A | 7/1986 | Kaufmann | | |
| 4,619,311 A | 10/1986 | Vasile | | |
| 4,700,749 A * | 10/1987 | Cadars | F28F 13/12 | 138/38 |
| 4,727,907 A * | 3/1988 | Duncan | F28F 13/12 | 138/38 |
| 4,794,980 A * | 1/1989 | Raisanen | F24F 12/001 | 138/38 |
| 4,821,793 A | 4/1989 | Sheffield | | |
| 4,881,596 A * | 11/1989 | Bergmann | F28F 9/028 | 165/174 |
| 4,899,812 A * | 2/1990 | Altoz | B01F 5/0616 | 138/38 |
| 5,094,224 A * | 3/1992 | Diesch | F28F 1/42 | 126/110 R |
| 5,361,828 A * | 11/1994 | Lee | F01D 5/187 | 165/109.1 |
| 5,552,021 A * | 9/1996 | Ilvesp aa | D21F 1/48 | 162/198 |
| 5,791,401 A | 8/1998 | Mobile | | |
| 6,164,813 A | 12/2000 | Wang | | |
| 6,189,607 B1 * | 2/2001 | Hosoya | F28D 1/05366 | 165/109.1 |
| 6,284,362 B1 * | 9/2001 | Takai | A61L 15/18 | 427/213 |
| 6,286,465 B1 * | 9/2001 | Hughes | F23M 9/003 | 122/155.2 |
| 6,422,179 B2 * | 7/2002 | Hughes | F23M 9/003 | 122/155.2 |
| 6,944,947 B1 * | 9/2005 | Damsohn | F28D 7/1684 | 165/109.1 |
| 7,055,586 B2 * | 6/2006 | Sakakibara | F28D 7/1684 | 138/38 |
| 7,096,885 B2 | 8/2006 | Van Decker | | |
| 7,438,464 B2 * | 10/2008 | Moser | B01F 5/0612 | 366/336 |
| 7,694,717 B2 | 4/2010 | Bonner et al. | | |
| 8,464,635 B1 * | 6/2013 | Sprinkle | A47J 37/1214 | 99/403 |
| 8,753,006 B2 * | 6/2014 | Habibi-Naimi | B29C 44/428 | 366/337 |
| 8,936,391 B2 * | 1/2015 | Stoeckli | B01F 13/002 | 366/337 |
| 9,103,250 B2 * | 8/2015 | Iwasaki | F28F 3/027 | |
| 9,243,853 B2 * | 1/2016 | Velan | F28F 9/00 | |
| 9,724,653 B2 * | 8/2017 | Pappalardo | B01F 5/0606 | |
| 9,764,296 B2 * | 9/2017 | Linne | B01F 5/0641 | |
| 9,982,915 B2 * | 5/2018 | Savard | F24S 10/502 | |
| 2003/0048694 A1 * | 3/2003 | Horner | B01F 5/0617 | 366/337 |
| 2004/0008576 A1 * | 1/2004 | Henning | B29C 48/70 | 366/337 |
| 2004/0159110 A1 | 8/2004 | Janssen | | |
| 2005/0121179 A1 | 6/2005 | Shibagaki et al. | | |
| 2007/0095514 A1 | 5/2007 | Inoue et al. | | |
| 2007/0163762 A1 | 7/2007 | Studer | | |
| 2008/0000616 A1 | 1/2008 | Nobile | | |
| 2009/0056919 A1 * | 3/2009 | Hoffman | F28F 13/08 | 165/109.1 |
| 2009/0223648 A1 | 9/2009 | Martin | | |
| 2010/0097883 A1 * | 4/2010 | Habibi-Naini | B01F 5/0615 | 366/337 |
| 2011/0011565 A1 * | 1/2011 | Hou | F28D 15/0233 | 165/104.26 |
| 2011/0024080 A1 * | 2/2011 | Bose | F28D 7/08 | 165/71 |
| 2011/0024093 A1 * | 2/2011 | Shiraichi | F28F 1/126 | 165/109.1 |
| 2011/0094708 A1 | 4/2011 | Cardone | | |
| 2011/0253347 A1 * | 10/2011 | Harrington | F28F 7/02 | 165/104.31 |
| 2012/0145362 A1 | 6/2012 | Harrington | | |
| 2012/0227939 A1 * | 9/2012 | Aplienz | F28D 1/0391 | 165/109.1 |
| 2012/0298340 A1 * | 11/2012 | Al-Otaibi | F28F 13/12 | 165/109.1 |
| 2013/0153183 A1 * | 6/2013 | Velan | F28D 21/0012 | 165/164 |
| 2013/0182529 A1 * | 7/2013 | Linne | B01F 5/0641 | 366/336 |
| 2013/0228315 A1 * | 9/2013 | Kennedy | H01L 23/473 | 165/109.1 |
| 2014/0102673 A1 * | 4/2014 | Joardar | F28F 13/12 | 165/109.1 |
| 2015/0377512 A1 * | 12/2015 | Muley | F24D 5/02 | 126/110 R |
| 2016/0201944 A1 * | 7/2016 | Zhang | F24H 1/205 | 122/18.31 |
| 2017/0343304 A1 * | 11/2017 | Negi | B01F 5/0617 | |
| 2018/0172366 A1 * | 6/2018 | Tateyama | F28D 1/0426 | |

FOREIGN PATENT DOCUMENTS

| | | | |
|---|---|---|---|
| EP | 2638961 A1 * | 9/2013 | ............ F28F 13/12 |
| JP | S6213958 | 1/1987 | |
| JP | 2009025002 | 2/2009 | |
| WO | 91/08433 | 6/1991 | |
| WO | 2005078369 | 8/2005 | |
| WO | 2011127574 | 10/2011 | |
| WO | WO-2018161419 A1 * | 9/2018 | |

(56) References Cited

FOREIGN PATENT DOCUMENTS

OTHER PUBLICATIONS

Extended European Search Report, EP Application No. 17166264.6, dated Sep. 27, 2017.

* cited by examiner

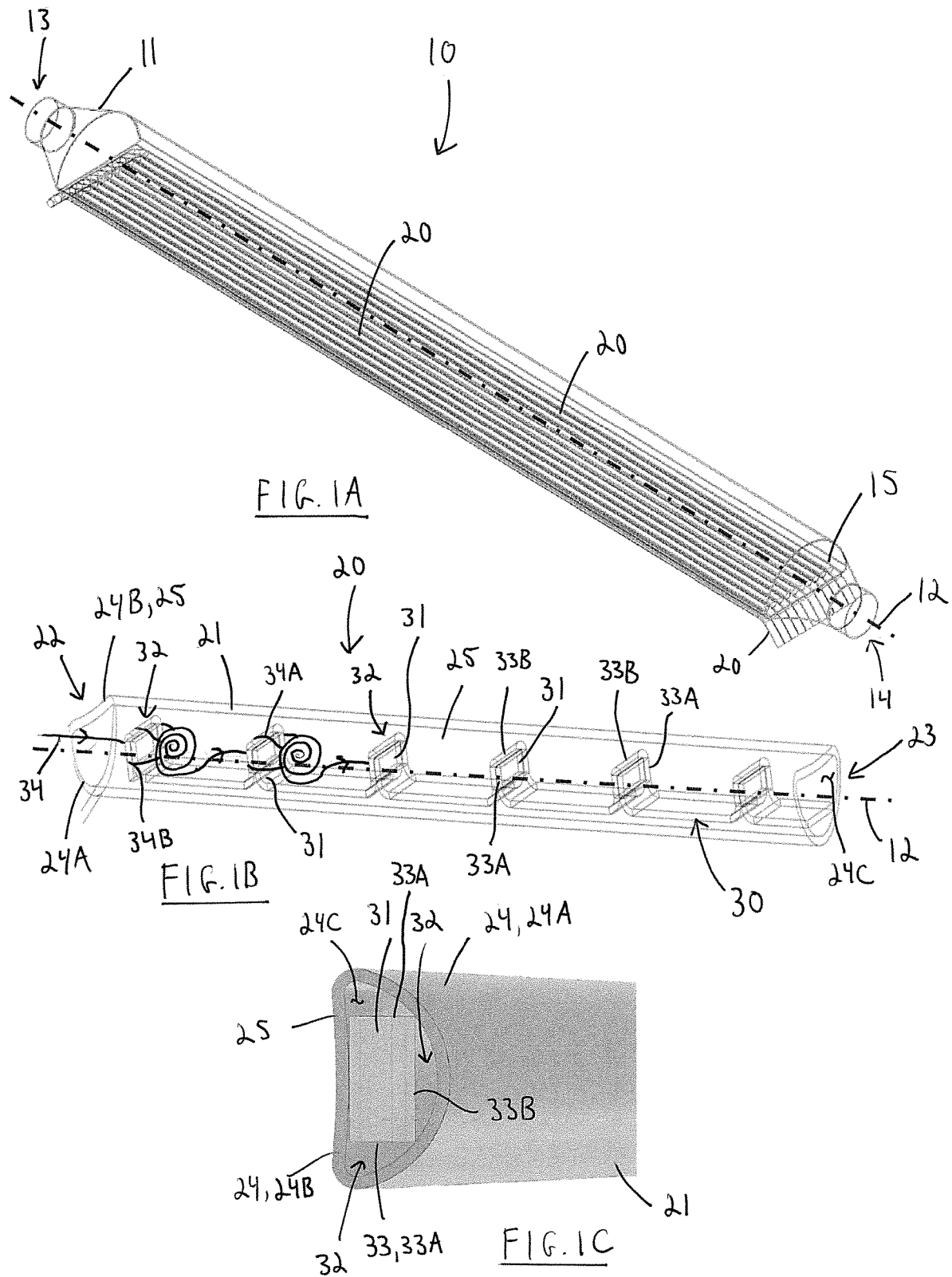

HEAT EXCHANGE CONDUIT AND HEAT EXCHANGER

CROSS-REFERENCE TO RELATED APPLICATIONS

This application claims priority to U.S. patent application No. 62/321,355 filed Apr. 12, 2016, the entire contents of which are incorporated by reference herein.

TECHNICAL FIELD

The application relates generally to fluid conduits and, more particularly, to heat exchangers.

BACKGROUND OF THE ART

Heated water is often rejected to the surrounding environment while still warm and thus becomes waste water. The heat in the waste water often has economic value, as it can be used to heat another fluid and save on heating costs.

A number of heat exchangers are known, but typically suffer from limited effectiveness with respect to heat transfer, relatively high cost and/or relatively large volume. Furthermore, some heat exchangers reduce the pressure of the fluid flowing through them.

SUMMARY OF THE INVENTION

There is accordingly provided a heat exchange conduit, comprising: a conduit body extending along a longitudinal axis between an inlet at one end thereof and an outlet at an opposed end thereof, a fluid flow passage extending between the inlet and the outlet for conveying a fluid therethrough, the conduit body enclosing the fluid flow passage having at least one conduit wall forming a heat-exchange wall, an inner surface of the conduit wall being in heat exchange relationship with the fluid within the fluid flow passage and an outer surface of the conduit wall shaped to be in heat exchange relationship with an object or fluid in contact therewith; and a turbulence strip disposed within the fluid flow passage of the conduit body, the turbulence strip being elongated and extending at least a majority of a length of the conduit body along the longitudinal axis, the turbulence strip having a plurality of flow impact walls which are longitudinally spaced-apart with respect to the longitudinal axis, each of the flow impact walls being perpendicular to the longitudinal axis and having a peripheral rim, a flow gap for the fluid being defined between at least a portion of the peripheral rim of each of the flow impact walls and the inner surface of the conduit wall adjacent thereto.

There is also provided a heat exchanger, comprising: a first elongated conduit extending along a longitudinal axis between a first inlet at one end thereof and a first outlet at an opposed end thereof, the first conduit including a first heat-exchange wall; a plurality of second elongated conduits extending along and parallel to the first conduit, each of the second conduits being in fluid communication with a second inlet at one end thereof and with a second outlet at an opposed end thereof, each of the second conduits including a second heat-exchange wall having a shape complementary to that of the first heat-exchange wall of the first conduit, each of the second conduits being retained against the first conduit with the second heat-exchange walls of the second conduits adjacent to the first heat-exchange wall of the first conduit and disposed in heat exchange relationship therewith; and an elongated turbulence strip disposed in each of the second conduits and extending along a length thereof, the turbulence strip having longitudinally spaced-apart flow impact walls, each of the flow impact walls being perpendicular to the longitudinal axis, a flow gap for fluid flow being defined between at least a portion of a peripheral rim of each of the flow impact walls and an adjacent inner wall of said second conduit.

There is further provided a method of manufacturing a heat-exchange conduit, comprising: providing a conduit body having at least one conduit wall enclosing a fluid flow passage, at least one of said conduit walls being a heat-exchange wall shaped to be in heat exchange relationship with an object or fluid in contact therewith; forming an elongated turbulence strip including a plurality of flow impact walls longitudinally spaced-apart along a longitudinal axis, each of the flow impact walls extending perpendicularly to the longitudinal axis; and inserting the turbulence strip into the fluid flow passage of the conduit body to define a flow gap for fluid flow between at least a portion of a peripheral rim of each of the flow impact walls and an adjacent inner surface of the conduit body facing the fluid flow passage.

BRIEF DESCRIPTION OF THE DRAWINGS

Reference is now made to the accompanying figures in which:

FIG. 1A is a perspective view of a heat exchanger, according to an embodiment of the present disclosure;

FIG. 1B is a perspective view of part of a heat exchange conduit of the heat exchanger of FIG. 1A;

FIG. 1C is an end view of the heat exchange conduit of FIG. 1B;

DETAILED DESCRIPTION

Figure 1D:
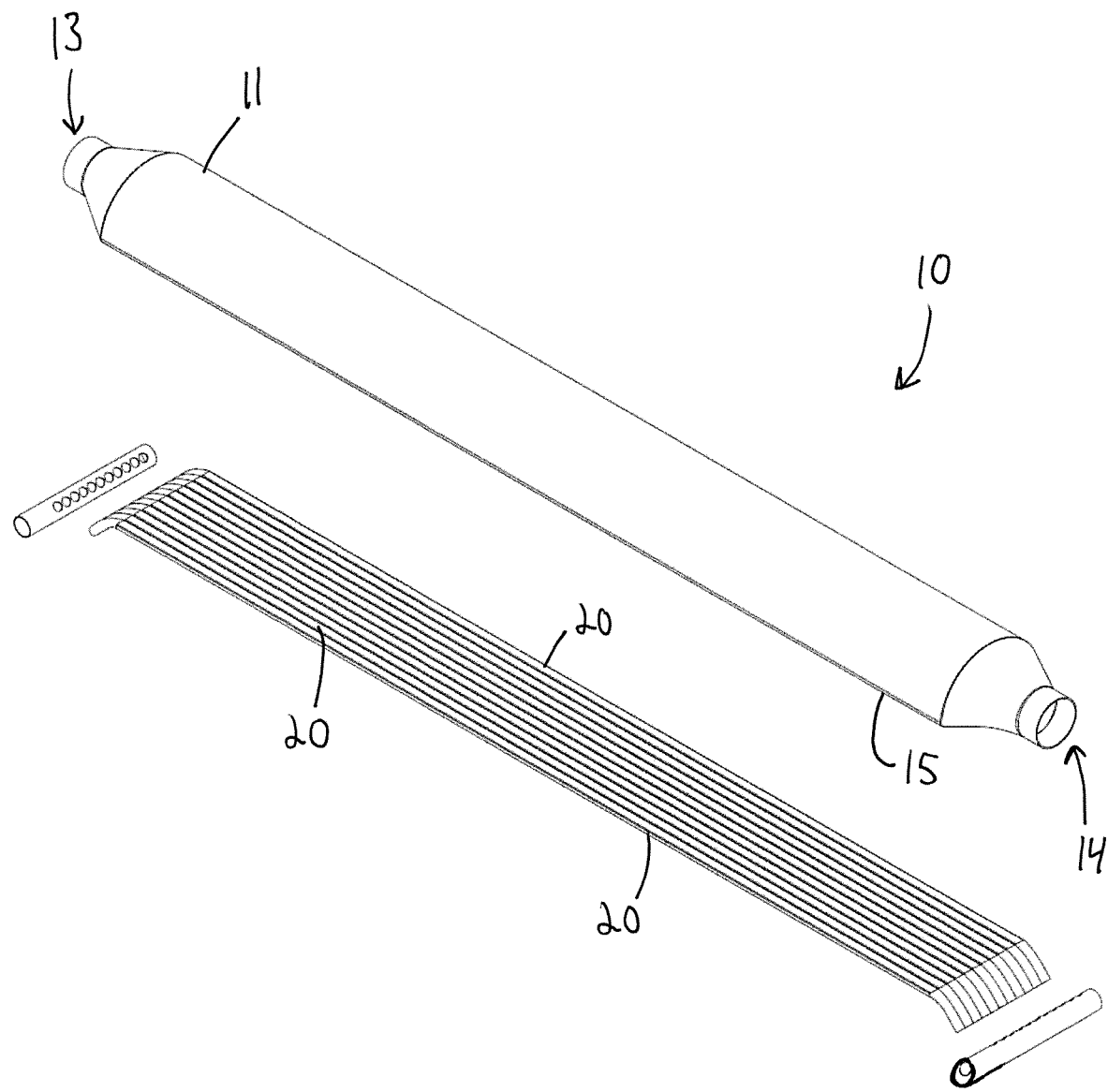
FIG. 1D is an exploded view of the heat exchanger of FIG. 1A.

FIGS. 1A and 1D illustrates a heat exchanger 10 for capturing heat from a waste fluid, such as waste water. Although shown in a substantially horizontal orientation, the heat exchanger 10 can have any other suitable orientation as required. The heat exchanger 10 has a first conduit 11 which extends along a longitudinal axis 12 between a first inlet 13 and an opposed first outlet 14. One or more of the walls of the first conduit 11 is a first heat-exchange wall 15. The first heat-exchange wall 15 is in heat exchange relationship with a fluid or object which contacts the first heat-exchange wall 15. The first heat-exchange wall 15 allows heat to transfer towards and/or away from the fluid within the first conduit 11. In the embodiment shown, the lower wall of the first conduit 11 is the first heat-exchange wall 15 and is in contact with correspondingly-shaped walls of multiple second fluid conduits 20, which are described in greater detail below. The first conduit 11 is therefore able to engage in conductive heat transfer, via its first heat-exchange wall 15, with the second fluid conduits 20 and the fluid flowing therein.

The heat exchanger 10 shown in FIGS. 1A and 1D may be fluidly connected to a waste water system. For example, the first inlet 13 of the first conduit 11 can be connected to a drain pipe which drains warm waste water from a sink, dishwasher, shower, or other appliance which uses hot water. The warm waste water flows through the first conduit 11 and along its first heat-exchange wall 15 toward the first outlet 14. Colder water which needs to be heated can flow in an opposite direction through the second conduits 20, which are in heat exchange relationship with the warm waste water of the first conduit 11 via its first heat-exchange wall 15. The colder water is thus warmed as it travels through the second conduits 20. In the embodiment shown, multiple second conduits 20 are joined together at each end by sealing along their mating faces. This sealing can be done by welding, soldering, brazing, gluing or any other suitable joining technique.

FIGS. 1B and 1C show one of the second conduits 20 of the heat exchanger 10. The second conduit 20 has a conduit body 21 which extends along the longitudinal axis 12 between an inlet 22 and a spaced-apart outlet 23 of the conduit body 21. As will be described in greater detail below, the conduit body 21 can have any suitable cross-sectional shape, and is not limited to the shape shown in FIGS. 1B and 1C. Similarly, the conduit body 21, and thus each second conduit 20, may not be a linear elongated object. The conduit body 21 can be curved, winding, or take other elongated forms between its inlet 22 and outlet 23, as will also be described in greater detail below. Each of the second conduits 20 of the heat exchanger 10 are the same as the second conduit 20 shown in FIGS. 1B and 1C. In an alternate embodiment, not all of the second conduits 20 of the heat exchanger 10 are the same.

The conduit body 21 has one or more conduit walls 24. The number of conduit walls 24 will depend on the cross-sectional shape of the conduit body 21. In the embodiment of FIGS. 1B and 1C, the conduit body 21 has a cross-section shaped like a "D", and thus has two conduit walls 24—a curved conduit wall 24A, and a substantially planar conduit wall 24B. More or fewer conduit walls 21 are also possible. In another embodiment, the conduit body 21 has a circular cross-sectional shape, such as a circle or an oval, and thus has only one conduit wall 24. In yet another embodiment, the conduit body 21 has a rectangular cross-sectional shape, and thus has four conduit walls 24. The conduit body 21 may be formed by a single metal or plastic extrusion.

One or more of the conduit walls 24 is a second heat-exchange wall 25. Similarly to the first heat-exchange wall 15 described above, each second heat-exchange wall 25 facilitates heat transfer towards and/or away from the fluid within the conduit body 21. Each second heat-exchange wall 25 is in heat exchange relationship with another object which is in contact therewith (e.g. the first heat-exchange wall 15), or with a fluid flowing along an outer surface of the second heat-exchange wall 25.

The second heat-exchange wall 25 is therefore shaped to optimise the heat-exchange relationship with another object or fluid, and the shape of the second heat-exchange wall 25 can take many forms to achieve such functionality. For example, and as shown in FIGS. 1A and 1B, the second heat exchange wall 25 is the planar conduit wall 24B which is in contact heat exchange relationship with the first heat-exchange wall 15. The shapes of the first and second heat-exchange walls 15,25 are therefore complementary, and in the illustrated embodiment, are substantially planar. In another embodiment, where each second heat-exchange wall 25 is in heat exchange relationship with a fluid flowing along an outer surface thereof, an outer surface of each second heat-exchange wall 25 may form a channel to allow the fluid to pool against each second heat-exchange wall 25 as it flows therealong. Irrespective of the shape of each second heat-exchange wall 25, the surface area of each second heat-exchange wall 25 can be optimised to effect a larger heat transfer. It is observed that the amount and/or rate of heat transfer can be affected by adjusting the surface area of the heat transfer agent engaged with each second heat-exchange wall 25.

Still referring to FIGS. 1B and 1C, each of the second conduits 20 has an elongated turbulence strip 30 (or "turbulator") located within its conduit body 21 and extending along some or all of the length of the conduit body 21. The turbulence strip 30 increases the turbulence of the fluid flowing through the conduit body 21 to encourage heat transfer. More particularly, the turbulence strip 30 is used to increase convection rates and heat transfer coefficients at heat exchange surfaces in fluid passageways in order to provide high performance in compact heat exchange assemblies, and to orientate fluids into a pre-defined direction often resulting in chaotic paths.

The turbulence strip 30 is a single piece of material (e.g. plastic or metal) having a unibody construction. The turbulence strip 30 is therefore a one-piece construction. In the embodiment shown, the turbulence strip 30 can be physically manipulated to achieve the desired form. More particularly, different portions of the turbulence strip 30 may be bent, folded, stamped, or otherwise manipulated during or after manufacturing the turbulence strip 30. This forms barriers which impede the flow of fluid through the conduit body 21, thereby increasing the turbulence of the flow. The barriers thus form flow impact walls 31, which are longitudinally spaced-apart along the length of the turbulence strip 30.

Each flow impact wall 31 is oriented perpendicularly to the longitudinal axis 12 of the conduit body 21 to obstruct the flow of the fluid within the conduit body 21, forcing the fluid to deviate around the flow impact wall 31 to thereby increase turbulence. In so doing, each flow impact wall 31 increases the overall distance that the fluid must travel through the conduit body 21. This increases the duration that the flow remains in the conduit body 21, thereby providing a longer exposure to heat transfer via the second heat-exchange wall 25.

In an embodiment, the turbulence strip 30 is unattached to the conduit body 21 along most of the length of the conduit body 21, and can be attached by mechanical means to a bend at each end of the conduit body 21. The turbulence strip 30 may also be attached to the interior of the conduit body 21 using any suitable technique such that the flow impact walls 31 remain stationary relative to the conduit body 21. For example, in the embodiment of FIG. 1B, each flow impact wall 31 has a peripheral rim 33. The peripheral rim 33 of each flow impact wall 31 has side segments 33A adjacent to the curved conduit wall 24A of the conduit body 21, and an exposed segment 33B adjacent to the planar conduit wall 24B. The side segments 33A and the exposed segment 33B are different portions of the peripheral rim 33. The exposed segment 33B of each flow impact wall 31 is exposed to fluid flowing through the conduit body 21 and allows fluid to pass around each flow impact wall 31. The attachment of the turbulence strip 30 or portions thereof to the conduit body 21 can take many forms. For example, a sealant may be used to join it to the conduit wall 24. The sealant can be any suitable waterproof sealing agent such as a silicon or polyurethane caulking agent, or a waterproof epoxy. In another embodiment, welding or brazing is used to join the turbulence strip, or some part thereof, to the conduit wall 24. Irrespective of the attachment technique that is used, the attachment forms an obstruction to the flow at the point of attachment, forcing fluid within the conduit body 21 to flow around the obstruction.

In the embodiment of FIGS. 1B and 1C, each flow impact wall 31 is a planar, solid wall body which prevents fluid from flowing through each flow impact wall 31. The obstruction of the fluid flow path by each flow impact wall 31 forces the fluid to flow around each flow impact wall 31 and through a flow gap 32. The flow gap 32 is a space or void defined at each flow impact wall 31 between some or all of a peripheral rim 33 of the flow impact wall 31 and an inner surface 24C of one or more of the conduit walls 24 adjacent to said flow impact wall 31. In the embodiment of FIG. 1B, the flow gap 32 is defined at each flow impact wall 31 between the exposed segment 33B of each peripheral rim 33 and the inner surface 24C of the second heat-exchange wall 25.

It can thus be appreciated that a fluid flow passage 34 extends through the conduit body 21 of each second conduit 20. The fluid flow passage 34 defines a path followed by a fluid flowing in the conduit body 21 between the inlet 22 and the outlet 23 thereof. More particularly, and as shown in FIG. 1B, the fluid flow passage 34 is formed by the flow obstructions created by each spaced-apart flow impact wall 31 and their point of attachment with the conduit walls 24, such that the fluid flow passage 34 extends through the conduit body 21 along the series of flow gaps 32. The fluid flow passage 34 of each conduit body 21 therefore has a length greater than that of the conduit body 21. The cross-sectional area of the fluid flow passage 34, as defined in a plane that is transverse to the longitudinal axis 12, is smaller than the cross-sectional area of the conduit body 21.

Still referring to FIGS. 1B and 1C, the fluid flow passage 34 at the inlet 22 of the conduit body 21 allows fluid to flow in a relatively uniform flow stream. Once the fluid flow impacts the flow impact walls 31 of the turbulence strip 30, the fluid flow passage 34 is partitioned in the embodiment of FIG. 1B into a first fluid flow passage 34A over the exposed segment 33B of each flow impact wall 31, and into a second fluid flow passage 34B along the side segments 33A of the flow impact wall 31. In the embodiment of FIGS. 1B and 1C, the first fluid flow passage 34A is defined between the side segments 33A of the peripheral rim 33 and the adjacent inner surface 24 of the curved conduit wall 24A. The second fluid flow passage 34B is defined between the exposed segment 33B of the peripheral rim 33 and the adjacent inner surface 24 of the planar conduit wall 24B, which is also the heat-exchange wall 25. The first and second fluid flow passages 34A,34B reunite behind the flow impact wall 31 into the single fluid flow passage 34. This process is repeated for each flow impact wall 31 until the fluid exits the second conduit 20 at its outlet 23.

It can thus be appreciated that the turbulence strip 30 helps to form a fluid flow passage 34 defined by the combination of the conduit walls 24 of the second conduit 20, and the flow impact walls 31. Substantially all of the fluid flow is therefore intended to pass through the flow gaps 32 between each flow impact wall 31 and the conduit walls 24. In the depicted embodiment, there are no flow paths through each flow impact wall 31 itself. In contrast, some conventional flow-obstructing bodies used to increase turbulence within a conduit allow the fluid to flow though the flow-obstructing bodies. The turbulence strip 30 shown in FIGS. 1B and 1C does not allow such a through flow, as most if not all of the fluid is intended to flow via the flow gaps 32 within the second conduit 20.

Some embodiments of the turbulence strip 30 are now described in greater detail with reference to FIGS. 2 and 3.

Figure 2:
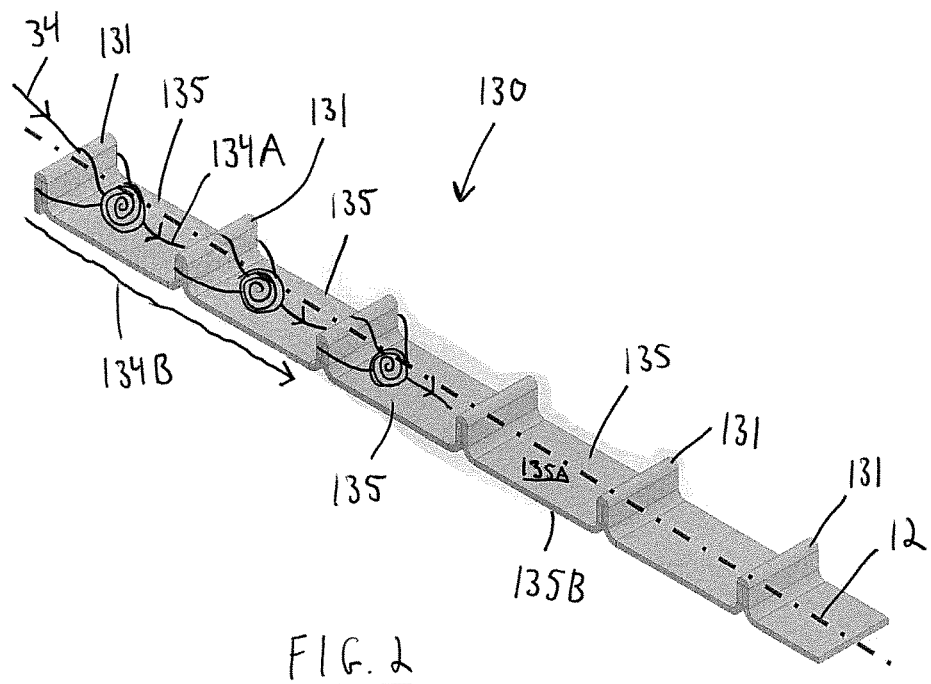
FIG. 2 is a perspective view of a turbulence strip for a heat exchange conduit, according to another embodiment of the present disclosure.

Referring to FIG. 2, the turbulence strip 130 includes planar flow walls 135 each of which extends between two spaced-apart flow impact walls 131. Each planar flow wall 135 is parallel to the longitudinal axis 12 and aligned along a direction of fluid flow through the conduit body 21. Each planar floor wall 135 includes a first surface 135A, and an opposed second surface 135B. In this embodiment, the turbulence strip 130 is not symmetric. Instead, the turbulence strip includes longitudinally-spaced apart and parallel flow impact walls 131, each of which is interconnected by planar flow walls 135 which extend perpendicularly to the flow impact walls 131. This configuration of the turbulence strip 130 helps to create a divergent fluid flow passage 34. More particularly, when this turbulence strip 130 is positioned within a horizontally-oriented second conduit 20, an upper fluid flow path 134A is formed above and to the sides of the flow impact walls 131. Turbulent flow is expected along this upper fluid flow path 134A as the fluid fills the low pressure area created on the back side of each flow impact wall 131. A bottom fluid flow path 134B is formed beneath the planar flow walls 135. The fluid flow passage 34 therefore extends along both sides of the planar flow walls 135. The bottom fluid flow path 134B is relatively straight and is defined by the bottom conduit walls of the second conduit and the flat bottom of the planar flow walls 135. In contrast to the upper fluid flow path 134A, substantially laminar flow is expected along the bottom fluid flow path 134B.

Figure 3:
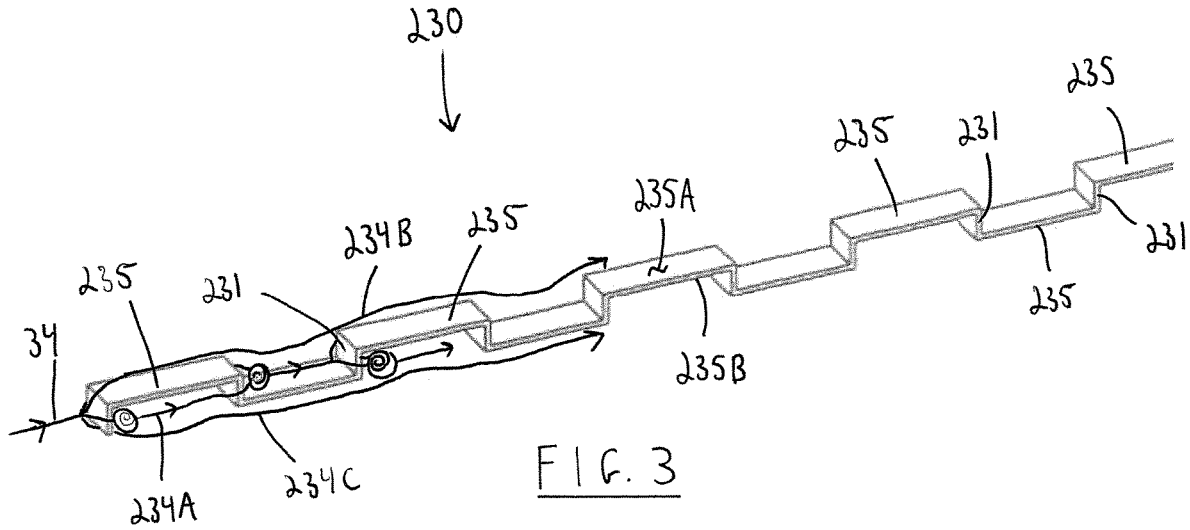
FIG. 3 is a perspective view of a turbulence strip for a heat exchange conduit, according to yet another embodiment of the present disclosure.

Another embodiment of the turbulence strip 230 is shown in FIG. 3. The turbulence strip 230 is symmetric, and has planar flow walls 235 extending between longitudinally spaced-apart flow impact walls 231. Each planar floor wall 235 includes a first surface 235A, and an opposed second surface 235B. Each flow impact wall 231 extends away from one of the first or second surfaces 235A,235B. Each planar flow wall 235 is offset from an adjacent planar flow wall 235 in a direction that is perpendicular to the longitudinal axis. The parallel planar flow walls 235 therefore alternate between being on the bottom and the top of the conduit body of the second conduit, when it is oriented substantially horizontally. The turbulence strip 230 helps to create a divergent fluid flow passage 34. More particularly, when the turbulence strip 230 is positioned within a horizontally-oriented second conduit 20, a turbulent fluid flow path 234A is formed about the sides of the flow impact walls 231. Turbulent flow is expected along this turbulent fluid flow path 234A as the fluid fills the low pressure area created on the back side of each flow impact wall 231. Top and bottom fluid flow paths 234B,234C are formed between the planar flow walls 235 and upper and lower conduit walls. The top and bottom fluid flow paths 234B,234C are relatively straight and are defined by the top and bottom conduit walls of the second conduit and the flat surfaces of the offset planar flow walls 235. In contrast to the turbulent fluid flow path 234A, substantially laminar flow is expected along the top and bottom fluid flow paths 234B,234C. The turbulent fluid flow path 234A mixes with the top and bottom fluid flow paths 234B,234C on the back side of each flow impact wall 231, and the combined flow path is expected to be turbulent.

Figure 4A:
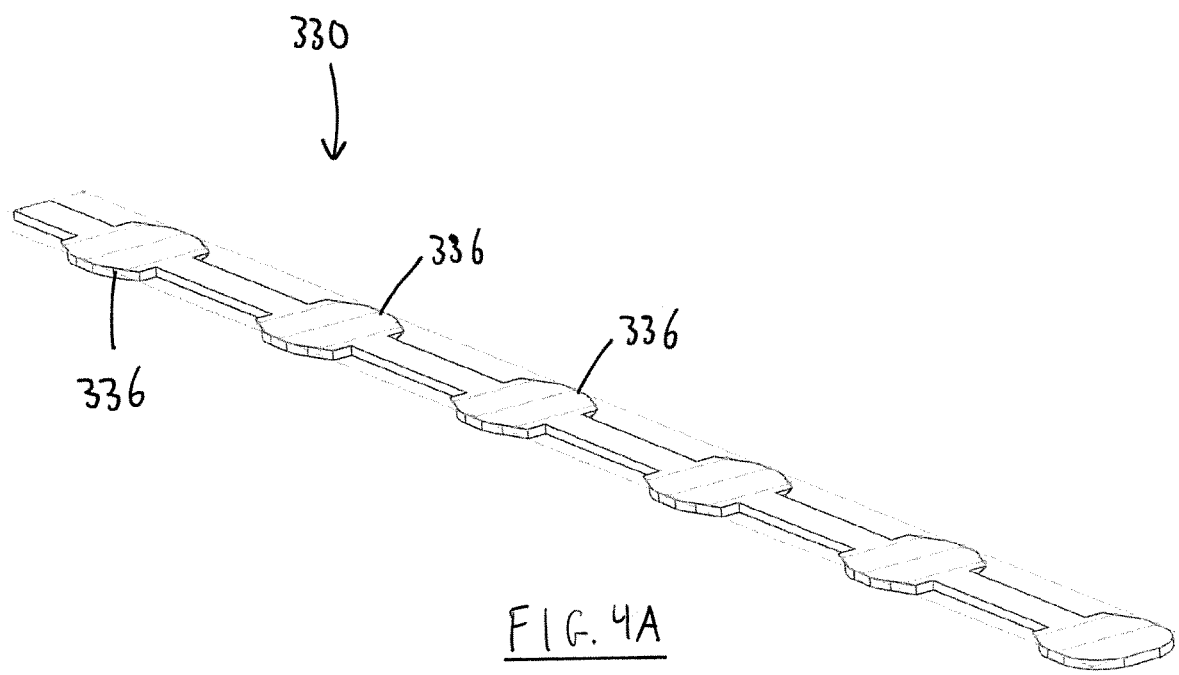
FIG. 4A is a perspective view of a turbulence strip having foldable portions, according to yet another embodiment of the present disclosure.
Figure 4B:
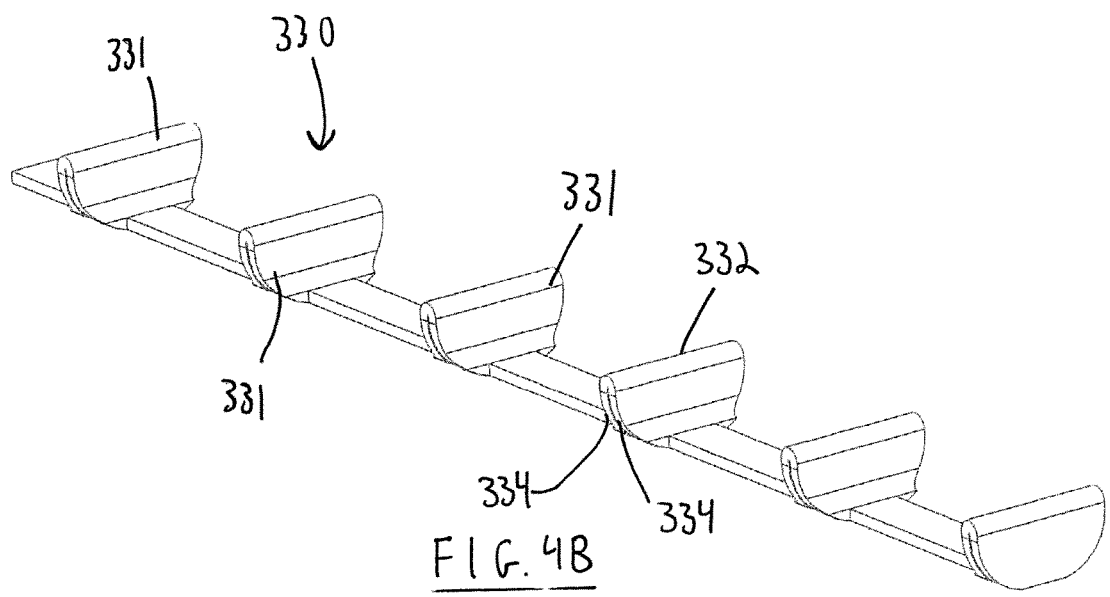
FIG. 4B is a perspective view of the turbulence strip of FIG. 4A, the foldable portions being shown folded into flow impact walls.

Another embodiment of the turbulence strip 330 is shown in FIGS. 4A and 4B. Referring to FIG. 4A, the turbulence strip 330 has longitudinally spaced-apart foldable portions 336. Each of the foldable portions 336 is bent, folded, stamped, or otherwise manipulated during or after manufacturing the turbulence strip 330 to form a corresponding flow impact wall 331 as shown in FIG. 4B. Each flow impact wall 331 includes a fold line 332 about which two fold portions 334 of the foldable portions 336 are folded. The turbulence strip 330 is a single piece of material. The turbulence strip 330 and its foldable portions 336 can be precut to have different widths along its length so that the flow impact walls 331 formed from the foldable portions 336 create the desired fluid flow path through the second conduit upon being inserted therein, and attached thereto. In the embodiment shown, each foldable portion 336 is shaped to be inserted within a second conduit having a "D"-shaped cross-sectional shape. Each foldable portion 336 can also be shaped to form a circular flow-impact wall 331 to substantially fill a second conduit having a circular cross-sectional shape.

Figure 5A:
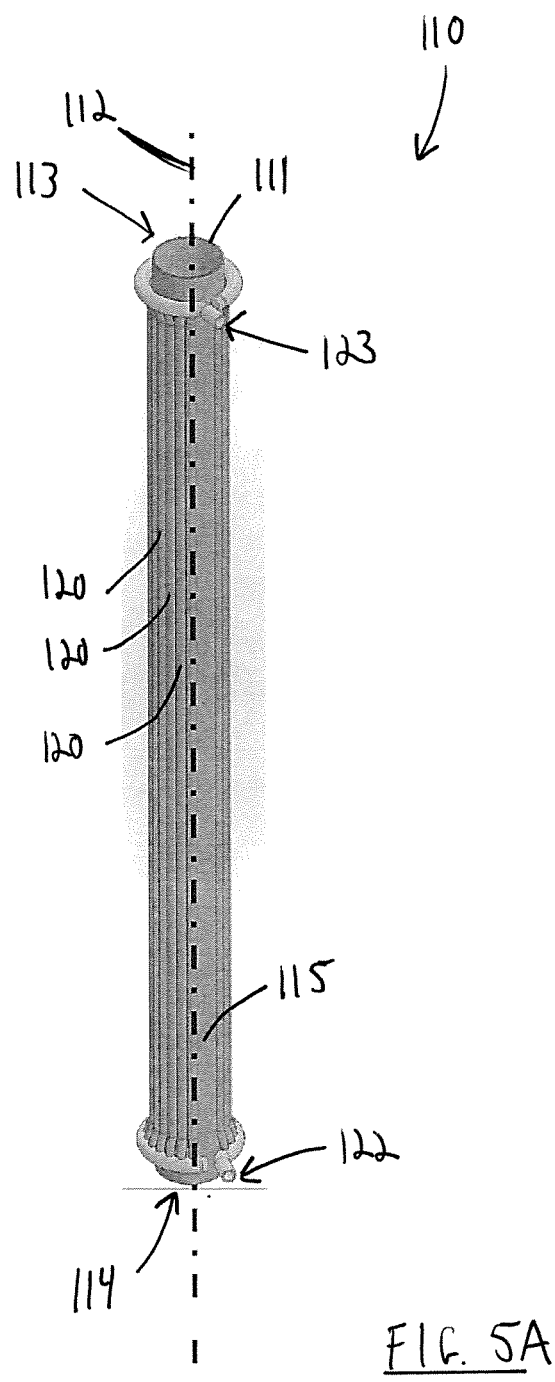
FIG. 5A is a perspective view of a heat exchanger, according to yet another embodiment of the present disclosure.
Figure 5B:
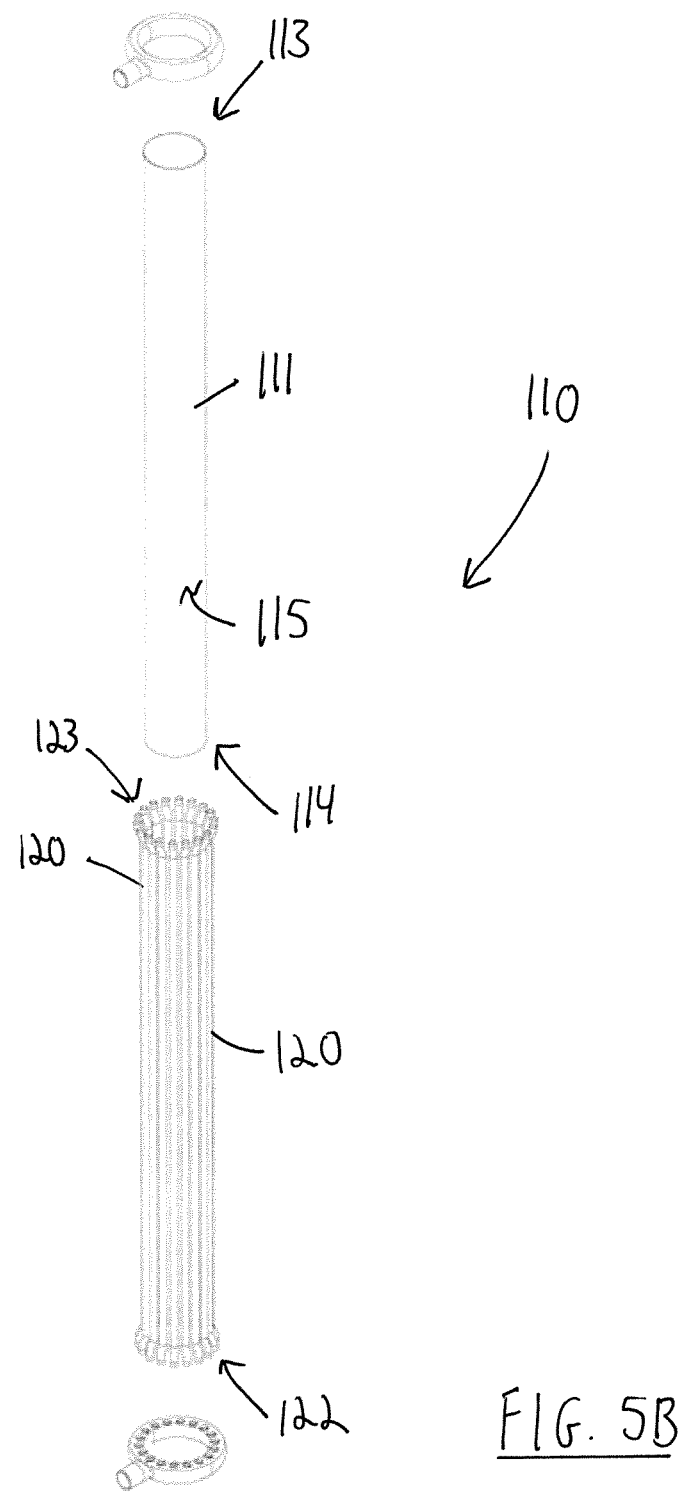
FIG. 5B is an exploded view of the heat exchanger of FIG. 5A.

FIGS. 5A and 5B show an embodiment of the heat exchanger 110 having an upright and/or vertical orientation. The heat exchanger 110 has an upright first conduit 111 extending along an upright longitudinal axis 112 between an upper first inlet 113 and a lower first outlet 114. The first conduit 111 has a circular cross-sectional shape, and thus has a single conduit wall which forms the first heat-exchange wall 115. Multiple upright second conduits 120 extend along and are parallel to the first conduit 111. Each of the second conduits 120 extends between a second inlet 122 at one end thereof and a second outlet 123. A second heat-exchange wall of each second conduit 120 has a shape that is complementary to that of the first heat-exchange wall 115. Each of the second conduits 120 is retained against the first conduit 111, with the second heat-exchange walls of the second conduits 120 being curved to mate with the curved outer surface of the first heat-exchange wall 115.

Figure 6A:
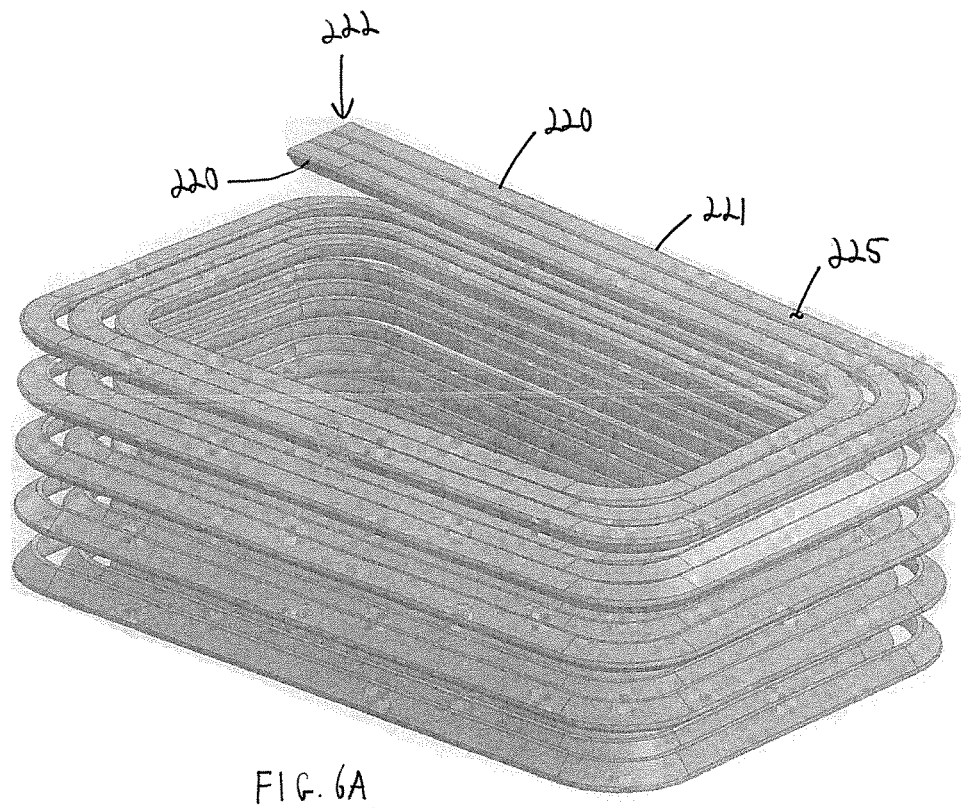
FIG. 6A is a perspective view of coiled heat exchange conduits, according to yet another embodiment of the present disclosure.
Figure 6B:
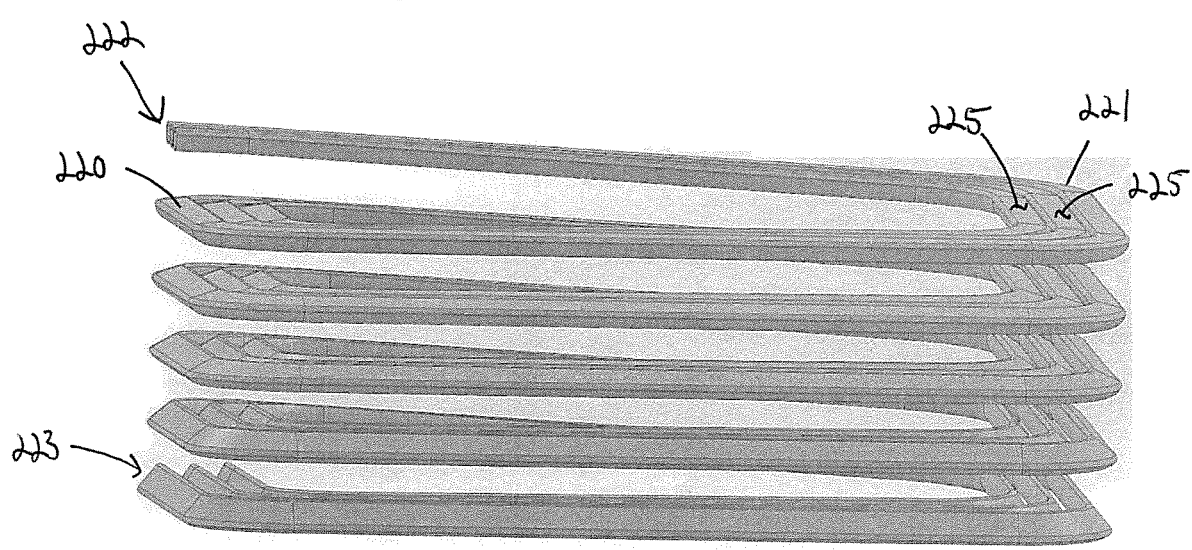
FIG. 6B is a side view of the coiled heat exchange conduits of FIG. 6A.

FIGS. 6A and 6B show another embodiment of the second conduits 220. The conduit body 221 of each second conduit 220 is coiled between its inlet 222 and its outlet 223. Each heat-exchange wall 225 is substantially planar and is shaped to be in heat exchange relationship with a fluid flowing down the coil shape along an outer surface of the heat-exchange wall 225. A heat exchanger is thus formed by the second conduits 220, in that the second conduits 220 are arranged in a coil where warm water travels downward along the flattened heat-exchange walls 225 to heat the fluid flowing within each second conduit 220. In FIGS. 6A and 6B, the planar heat-exchange wall 225 contributes to each second conduit 220 having a substantially "D"-shaped cross-section. It can thus be appreciated that the flattened heat-exchange wall 225 of each second conduit 220 forms a descending track. Warm waste water, such as "grey" water from a dishwasher, can flow along the outer surface of the heat-exchange walls 225 to heat the cooler water inside the second conduits 220.

In light of the preceding, it can be appreciated that the turbulence strip 30,130,230,330 provides walls that are perpendicular to the flow direction. These flow impact walls force a fluid, such as water, to travel around, over, and/or under the flow impact walls, and on the backside create an area of low pressure. As water fills that area, it creates turbulence. The flow then returns to its normal flow pattern until it impacts the next flow impact wall. It can thus be appreciated that by dividing the flow into different paths, the turbulence strip 30,130,230,330 helps to lower pressure losses. Where multiple second conduits are disposed parallel to one another in low flow applications, the flow impact walls help to create back pressure and ensure even flow among the second conduits. Such a turbulence strip 30,130, 230,330 may prove to be particularly suitable for second fluid conduits which have irregular cross-sectional shapes (i.e. those which are flat on one side, or curved to match the radius of another conduit engaged therewith). Such a turbulence strip 30,130,230,330 may also improve the turbulence for fluids flowing at low flow rates. This compares favourably to some conventional flow-obstructing bodies used to increase turbulence, because these are less effective at creating turbulence for low flow rates. Flow-obstructing bodies which provide for a helical motion of fluid are examples of these.

The turbulence strip 30,130,230,330 disclosed herein can also be manufactured relatively easily from a single strip of material, such as a metal. This facilitates insertion of the turbulence strip 30,130,230,330 within the second conduit, and its attachment thereto. In some instances, the turbulence strip 30,130,230,330 can be positioned inside the second conduit when welding, without taking some of the usual precautions associated with welding, as may be the case with flow obstruction devices made from plastic. This may help to lower the cost of manufacturing the second conduits, as well as increase the speed at which they can be made.

Some configurations of the turbulence strip 30,130,230, 330 may use about 50% less material than some conventional fluid-obstructing bodies. When the turbulence strip 30,130,230,330 is made from copper, for example, the second conduit can be manufactured more quickly because a complex cooling system is not required during the welding of the turbulence strip 30,130,230,330 to the second conduit. This compares favourably to conventional flow-obstruction bodies made from plastic, which would melt at standard welding temperatures.

As used herein the term "fluid" is intended to mean gas or liquid. Examples of liquids suitable for use with the heat exchangers described herein include, but are not limited to, water, hydraulic fluid, petroleum, glycol, chemicals, oil and the like, and steam. One example of a gas includes combustion engine exhaust gases. As used herein, the term "water" is illustrative and not intended to limit the scope of the functioning of devices described within. In any given usage, the term water can be replaced with the term fluid.

As used herein, the term "close thermal contact", "tight thermal contact" or "thermal contact" is intended to mean a joint between two surfaces that is close enough for direct conduction heat transfer to take place. This can be achieved by solder, brazing, or welding the two surfaces together. It can also be achieved by gluing with a thermally conductive adhesive or gel. It can also be achieved by ensuring a sufficient clamping force, and that the mating surfaces are flat and clean.

Referring to FIGS. 1B and 1C, there is also disclosed a method of manufacturing a heat-exchange conduit 20. The method includes providing a conduit body 21 having at least one conduit wall 24. One of the walls 24 is a heat-exchange wall 24 shaped to be in heat exchange relationship with an object or fluid in contact therewith. The method includes forming longitudinally spaced-apart flow impact walls 31 in an elongated turbulence strip 30. Each flow impact wall 31 is perpendicular to a longitudinal axis 12 of the conduit body 21. The method includes inserting the turbulence strip 30 and its flow impact walls 31 into the conduit body 21 to define a flow gap 32 for fluid flow between at least a portion of a peripheral rim 33 of each flow impact wall 31 and an adjacent inner surface 24 of the conduit body 21.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A drain water heat exchanger, comprising:
a conduit body extending along a longitudinal axis between an inlet at one end thereof and an outlet at an opposed end thereof, a fluid flow passage extending between the inlet and the outlet for conveying colder water therethrough, the conduit body enclosing the fluid flow passage and having a cross-section shaped as a "D", the conduit body including a first curved wall and a second planar wall forming a heat-exchange wall to absorb heat from warmer waste water from a drain, an inner surface of the second planar wall being in heat exchange relationship with the colder water within the fluid flow passage and an outer surface of the second planar wall shaped to be in heat exchange relationship with the warmer waste water; and
a turbulence strip disposed within the fluid flow passage of the conduit body, the turbulence strip being elongated and extending at least a majority of a length of the conduit body along the longitudinal axis, the turbulence strip having a plurality of flow impact walls which are longitudinally spaced-apart with respect to the longitudinal axis, each of the flow impact walls defining a wall area occupying a majority of a cross-sectional area of the conduit body and being perpendicular to the longitudinal axis, each of the flow impact walls having a peripheral rim with a first portion extending from the inner surface of the second planar wall to contact an inner surface of the first curved wall at a first intersection, a second portion extending from the inner surface of the second planar wall to contact the inner surface of the first curved wall at a second intersection spaced apart from the first intersection in a direction parallel to the second planar wall, and a third portion extending between the first and second intersections and spaced inwardly from the inner surface of the first curved wall, a first flow gap for the colder water defined between the first portion of the peripheral rim, the inner surface of the second planar wall and the inner surface of the first curved wall, a second flow gap for the colder water defined between the second portion of the peripheral rim, the inner surface of the second planar wall and the inner surface of the first curved wall, and a third flow gap for the colder water defined between the third portion of the peripheral rim and the inner surface of the first curved wall and extending between the first and second intersections with the first curved wall.

2. The drain water heat exchanger as defined in claim 1, wherein each flow impact wall defines a planar solid surface shaped to obstruct a flow of the colder water therethrough.

3. The drain water heat exchanger as defined in claim 1, wherein the turbulence strip includes planar flow walls each extending between two of the flow impact walls, each planar flow wall having a first surface and an opposed second surface and being parallel to the longitudinal axis, the flow impact walls extending from both the first and second surfaces of the planar flow walls.

4. The drain water heat exchanger as defined in claim 3, wherein each planar flow wall is offset from an adjacent planar flow wall in a direction being perpendicular to the longitudinal axis.

5. The drain water heat exchanger as defined in claim 1, wherein the fluid flow passage is defined by the first, second and third flow gaps and spaces between the longitudinally spaced-apart flow impact walls, the fluid flow passage having a length greater than a length of the conduit body.

6. The drain water heat exchanger as defined in claim 5, wherein the fluid flow passage has a cross-sectional area that is smaller than the cross-sectional area of the conduit body.

7. The drain water heat exchanger as defined in claim 1, wherein the conduit body has a horizontal orientation, the heat-exchange wall being an uppermost wall of the conduit body.

8. The drain water heat exchanger as defined claim 1, wherein the turbulence strip is a one-piece construction.

9. The drain water heat exchanger as defined in claim 1, wherein each of the flow impact walls is a folded portion of the turbulence strip.

10. The drain water heat exchanger as defined in claim 1, wherein the conduit body is coiled between the inlet and the outlet, the heat-exchange wall being shaped to be in heat exchange relationship with fluid flowing along the coil-shaped conduit body along an outer surface of the heat-exchange wall.

11. The drain water heat exchanger as defined in claim 1, wherein the conduit body has an upright orientation.

\* \* \* \* \*